United States Patent

Da Silva et al.

[11] Patent Number: 5,956,136
[45] Date of Patent: Sep. 21, 1999

[54] PROCESS AND DEVICE FOR OPTIMIZING THE POSITION AND THE WIDTH OF THE CUT-OFF BAND OF AN OPTICAL FILTERING DEVICE

[75] Inventors: Edouard Da Silva, Lille; Michel Delhaye, Villeneuve D'ascq; Michel Leclercq, Bois le Roi; Bernard Roussel, Valenciennes, all of France

[73] Assignee: Dilor, Lille, France

[21] Appl. No.: 09/065,386

[22] Filed: Apr. 23, 1998

[30] Foreign Application Priority Data

Apr. 24, 1997 [FR] France ................................. 97 05085

[51] Int. Cl.[6] .............................. G01J 3/44; G01N 21/65
[52] U.S. Cl. ....................... 356/301; 356/417; 356/419; 356/418
[58] Field of Search .................... 356/301, 417, 356/419, 303, 318; G01J 3/44; G01N 21/65

[56] References Cited

U.S. PATENT DOCUMENTS

| 4,082,464 | 4/1978 | Johnson, Jr. ............................. 356/188 |
| 5,112,127 | 5/1992 | Carrabba et al. ....................... 356/301 |
| 5,377,004 | 12/1994 | Owen et al. ............................ 356/301 |
| 5,661,557 | 8/1997 | Da Silva et al. ....................... 356/301 |

FOREIGN PATENT DOCUMENTS

| 0 535 753 A2 | 4/1993 | European Pat. Off. ........... G01J 1/00 |
| 465 905 | 1/1969 | Switzerland . |

OTHER PUBLICATIONS

D.F. Bowen et al., "Cascaded Wedge Etalon Filter," *IBM Technical Disclosure Bulletin*, vol. 34, No. 3, at 91–97 (Aug. 1991).

Konstantin V. Popov et al., "Broadband high–reflection multilayer coatings at oblique angles of incidence," *Applied Optics*, vol. 36, No. 10, at 2139–2151 (Apr. 1, 1997).

Janis Spigulis et al., "Compact dielectric reflective elements. II. Multichannel filter of closely spaced spectral bands," Applied Optics, vol. 33, No. 28, at 6638–6641 (Oct. 1, 1994).

*Primary Examiner*—Robert H. Kim
*Assistant Examiner*—Layla Lauchman
*Attorney, Agent, or Firm*—Fish & Neave; Jeffrey H. Ingerman; Brett G. Alten

[57] ABSTRACT

In an optical fittering device comprising at least two fitters, the first filter (EF1) is tilted by an angle of incidence whose value is adjusted to bring the cut-off limit of the first filter (EF1) closer to one of the sides of the line of the illumination beam (FLA), which reduces the optical density of the first filter, while the association in series of the first (EF1) and second (EF2) filters enables to obtain a high-pass filtering whose global density corresponds to the sum of the densities of the first and second filters and whose cut-off limit is lower than that obtained by a single filter tilted to its optimum angle. A third filter (EF3) mounted in parallel with respect to the first and second filters (EF1 and EF2) enables to obtain, at the level of the common collection path (TCC), a band eliminating filtering whose cut-off limits are positioned on either side of the illumination line with a view to an optimum analysis of the low frequency lines.

9 Claims, 10 Drawing Sheets

PROCESS AND DEVICE FOR OPTIMIZING THE POSITION AND THE WIDTH OF THE CUT-OFF BAND OF AN OPTICAL FILTERING DEVICE

This invention relates to the optimization of the position and of the width of the cut-off band of an optical filtering device.

It finds a general application in spectrometry where the presence of a very intense spectral line, generally the energizing line, prevents or disturbs the detection of lines or of spectral bands of greater intensity which are situated at wavelengths close to, and on either side of, that of the said intense line (designated thereafter low frequencies).

It finds therefore an application in spectrometry for transmission, diffusion (RAMAN), fluorescence, luminescence or absorption, and more particularly in dispersive or interferential spectrometry.

In the description, the expression <<transmitted light>>shall mean the global light transmitted by the sample. It encompasses consequently the light effectively diffused by the interaction of photons of the energizing line with the phonons of the material constituting the sample, but also the reflected light, the diffused light, the photoluminescent light, . . .

We already know optical filters capable of rejecting or absorbing one or several narrow spectral bands. Generally speaking, these optical filters are classified into three categories.

Figure 1A:
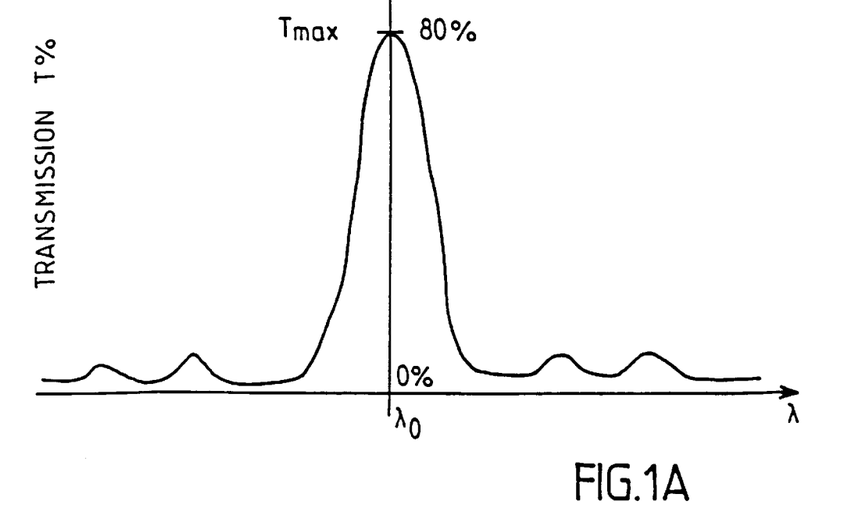
FIGS. 1A and 1B represent the spectral responses in transmission and in reflection of the first category of optical filters of the state of the art.
Figure 1B:
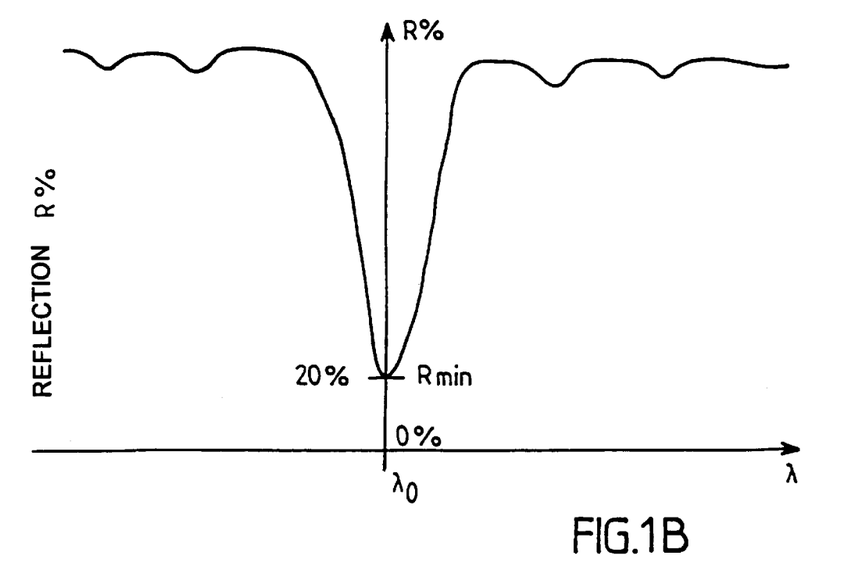

With reference to FIGS. 1A and 1B, the first category comprises optical filters which exhibit, in transmission, a narrow pass-band centered on a wavelength $\lambda_0$ with a typical value for the transmission maximum TMAX in the order of 50 to 80% (FIG. 1A). The spectral response from the reflection filter (FIG. 1B) is rigorously complementary, give or take the usual losses, to that in transmission and hence shows a minimum RMIN at the wavelength $\lambda_0$. The reflection response curve exhibits at wavelengths rather remote from the wavelength $\lambda_0$ other peaks or secondary bands ascribed to other interference orders. This first category comprises Fabry-Perot filters, multiple cavity interferential filters, multidielectric filters produced by thin layer application techniques . . .

The specialist knows that the cut-off band of these interferential filters can be moved inside the spectrum, either by varying the center index or by varying the distance between the reflecting layers or by varying the angle of incidence which causes apparent variation of the optical thickness of the layers.

Figure 2A:
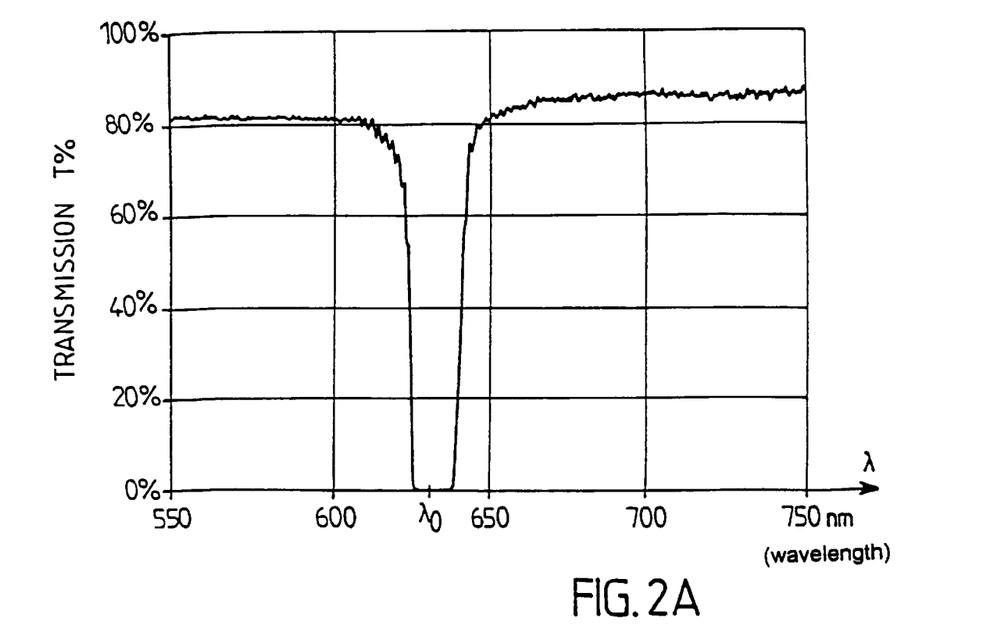
FIGS. 2A and 2B represent the spectral responses in transmission and in reflection of the second category of optical filters of the state of the art.
Figure 2B:
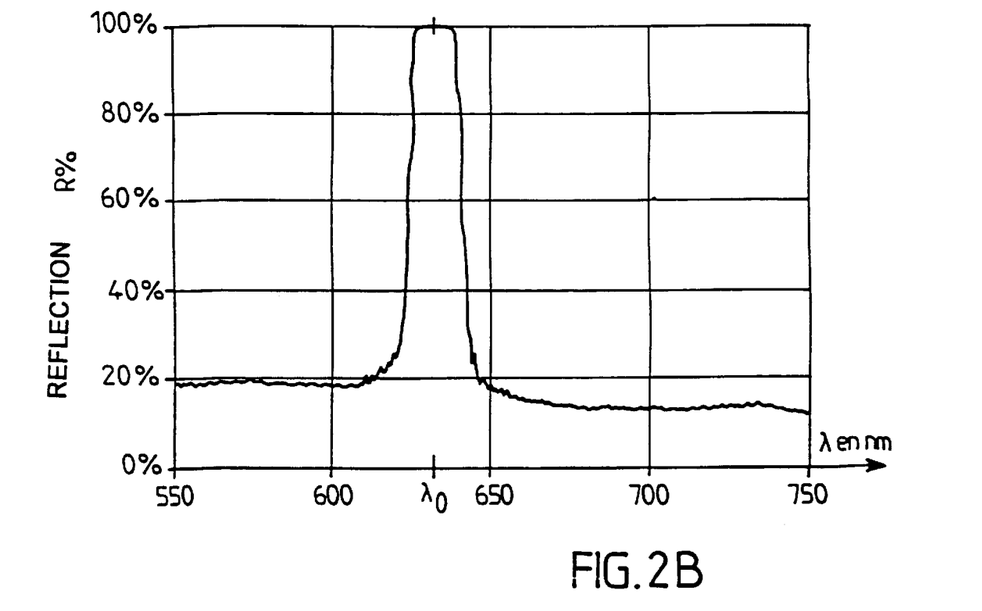

With reference to FIGS. 2A and 2B, the second category comprises optical filters which exhibit a response reverse of that of the first category. In transmission (FIG. 2A), they show therefore a cut-off band with a narrow rejection margin centered on a selected wavelength (here, $\lambda_0$ is 632.8 nm and the filter is that sold by the American company KAISER OPTICAL SYSTEM under the reference <<Holographic Notch plus filter>>). In reflection (FIG. 2B), they show a response complementary to that in transmission with a peak centered on the selected wavelength $\lambda_0$. In their cut-off band, these filters have a very high optical density (greater than 6), which enables them to reject an intense line.

Like the filters of the first category, the cut-off band of the filters of the second category can be moved by variation of the angle of incidence. The filters of the second category are most often manufactured according to a holographic technique where the interferences between two coherent beams produce a periodic variation of the refraction index of a photosensitive material in the form of strata in a thick layer.

This second category comprises the LIPPMAN interferential filters, the volume phase gratings, the so-called NOTCH holographic filters or the BRAGG or ASHER filters.

The third category of filters comprises the optical absorption filters which do not exhibit the complementarity of the spectral responses in transmission and in reflection. These filters are used generally in transmission. They are frequently combined with the filters of the first category to produce blocking filters designed for eliminating the secondary transmission peaks.

The filters belonging to this third category are for instance the glass filters colored by metal cations (transition metals, rare soils), organic colorants in solution or gels or in plastic material films or still metal vapor or iodine vapor filters or filters containing particles of a determined diameter in suspension . . .

Whatever the category of filters, they are all characterized by their attenuation at the wavelength of the energizing beam used to illuminate the sample to be analyzed, their transmission coefficients in the useful spectral domain and the limits as well as the cut-off slope of their cut-off bands.

Most often, attenuation is reflected on a logarithmic scale with optical density DO (for example, a 6-optical density DO corresponds to an attenuation of $10^6$ factor). The transmission coefficient, for its own part, is expressed on a linear scale in % in relation to the wavelength or to the number of waves in $cm^{-1}$. Finally, the limits and the cut-off slope of the cut-off band associated with the optical density of the <<cut off>>spectral reaction, determine the possibility to observe low frequency lines situated at wavelengths close to those of the energizing line.

Figure 3A:
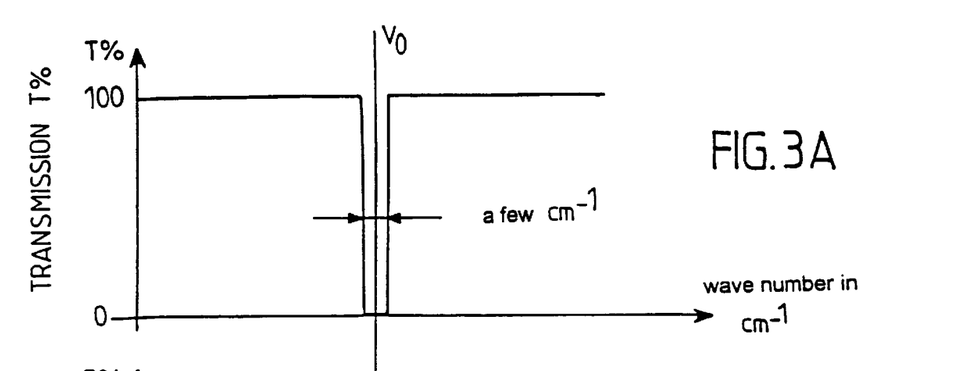
FIGS. 3A to 3C represent the performances of an ideal optical filter for the RAMAN or fluorescence spectrometry.
Figure 3B:
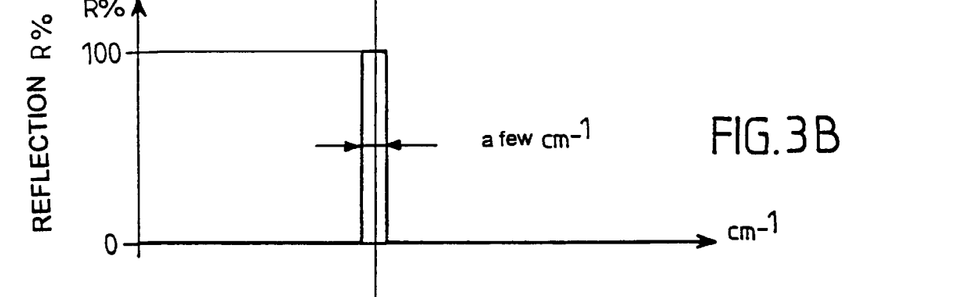
Figure 3C:
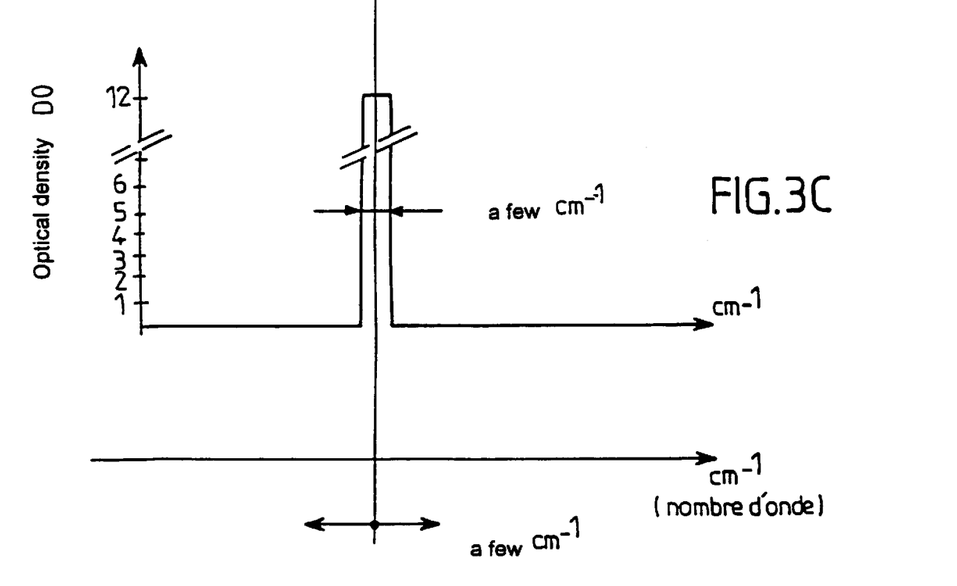

With reference to FIGS. 3A to 3C, the ideal filter would exhibit, for the RAMAN or fluorescence spectrometry, a reflection spectral response complementary to the reflection one with a 100% transmission coefficient and a 0% reflection coefficient. It should enable to reject the energizing line with a very high factor (for example with an optical density DO greater than 8 or 10) as well as to observe very low frequencies (for example the lines situated a few $cm^{-1}$ on either side of the energizing line). The ideal filter should therefore exhibit a spectral response which is quasi-symmetric with respect to the energizing line over a very narrow spectral band (of a few $cm^{-1}$) and has a rigorously vertical cut-off slope. Moreover, the ideal filter should be able to adjust its rated value over a few $cm^{-1}$ in order to suit the exact frequency of the illumination beam inasmuch as the illumination sources have sometimes a frequency which varies by a few $cm^{-1}$ according to the manufacture. Finally, there would not be any absorption outside the cut-off band (transmission and reflection coefficients rigorously constant over the whole spectral range from ultraviolet to infrared).

Still, such an ideal filter is currently difficult to manufacture and its implementation costly.

Moreover, when the specialist wishes to detect the low frequencies with a single filter, he generally accepts a compromise between the cut-off limits of the cut-off band and the value of the optical density since the cut-off limit is closer to the energizing line when the angle of incidence of the filter increases and the optical density decreases when the said angle of incidence increases. Thus, with a single filter, the specialist can find only one optimal angle for each kind of sample. Consequently, he must adjust accurately the angle of incidence of the filter as many times as there are kinds of sample to be analyzed, which makes the analysis more cumbersome and more complicated as we shall see more in detail with reference to FIG. 5A.

This invention brings a solution to these problems.

It aims thus at optimizing the position and the width of the cut-off band of an optical filtering device with a view to come closer to the performances of the ideal filter while resorting nevertheless to optical filters which are currently available on the market.

Thus, it relates to a device for optimizing the position and the width of the cut-off band of an optical filtering device comprising a first optical filter with a spectral response in transmission complementary to that in reflection and liable, on the one hand, to receive an illumination beam and to inject it onto a sample and, on the other, to receive the light transmitted by the sample so illuminated, and to direct it towards means of analysis after filtering, and a second optical filter interposed between the first filter and the means of analysis.

According to a general definition of the invention, the first filter is tilted by an angle of incidence whose value is adjusted to bring the cut-off limit of the first filter closer to one of the sides of the line of the illumination beam, which reduces the optical density of the first filter, while the association of the first and second filters enables to obtain a high-pass filtering whose global density corresponds to the sum of the densities of the first and second filters and whose cut-off limit is lower than that obtained by a single filter tilted to its optimum angle.

Thus, while increasing the value of the angle of incidence of the first filter, the cut-off band of the filtering device moves inside the spectrum and the cut-off limit (halfway up for instance) comes closer to one side of the energizing line. However, this coming closer is detrimental to the optical density of the first filter which decreases. In order to compensate for this reduction, the first and second filters are placed in series and their filtering characteristics are combined judiciously according to the invention to provide the requested high optical density enabling to suppress the energizing line.

The enrichment brought by this invention to the state of the art is not so much the arrangement of two or more filters put in series, which has been known for a long time, but a clever way of optimizing the coupling of the filters in order to expand the useful spectral zone to the low frequencies.

Optimizing the coupling between the first and the second filters enables advantageously, moreover, to compensate for signal modulations liable to crop up during the transmission of the useful lines.

In practice, the second filter should also be tilted by a second angle of incidence in order to bring the cut-off limit of the second filter closer, at least up to the cut-off limit of the first filter.

Surprisingly, the applicant has thus observed that by selecting the optimum values of the angles of incidence of the first and second filters which make that the sum of the optical densities of the said first and second filters reaches the value requested to suppress the energizing line, the useful spectral zone towards the low frequencies is larger than that obtained with a single filter, tilted optimally.

Such a device according to the invention enables to obtain a high-pass filtering, which prevents, for instance with RAMAN diffusion, any simultaneous analysis of the Stokes and anti-Stokes lines (useful for example for the accurate measurement of the temperature of a given sample).

It should be noted that the optimum tilt of a single filter for each kind of sample according to the previous art does not enable either, due to the width of the filter, to detect simultaneously the low frequency Stokes and anti-Stokes lines.

This invention also remedies this shortcoming.

Thus, it also relates to a device for optimizing the position and the width of a cut-off band of an optical filtering device composed of first and second filtering stages, a common illumination path and first and second collection paths mounted in parallel and liable to meet according to a common collection path at the level of means of analysis, whereby the first stage comprises at least one filter with a spectral response in transmission complementary to that in reflection and liable to receive an illumination beam and to inject it into a sample, and, to receive the light transmitted by the sample so illuminated, and to direct a first portion of the said light along the first collection path, and a second portion of the said light, complementary to the first, towards the second filtering stage which receives the said second portion and directs it after filtering along the second collection path.

According to another general definition of the invention, of the same inventive concept as that of the definition of the invention mentioned above, the first filtering stage comprises an association of filters placed in series and arranged to bring the cut-off limit of the first stage closer to one side of the line of the illumination beam, and the second stage comprises at least one filter arranged to bring the cut-off limit of the second stage closer to the other side of the line of the illumination beam, which enables to obtain at the level of the common collection path a band-eliminating filtering whose cut-off limits are positioned on either side of the illumination line with a view to an optimum analysis of the low frequency lines.

The applicant has already suggested in his Patent FR-A-2726365 the separation into two or more filtering paths, treated separately, followed by recombination over a common optical path directed towards the spectral analyzer. This notion of parallel filtering takes advantage of the known property of the filters of the first and second categories described above, i.e. complementarity of the spectral responses in transmission and in reflection. This invention brings a novelty to this state of the art while providing a combined <<series-parallel>>coupling of filters within an optical configuration which enables to bring the cut-off limits closer to the low frequencies, for instance in RAMAN, the STOKES as well as for the Anti-STOKES portions of the spectrum, which had not been feasible until now using the current filters.

Thus, thanks to the invention, the filtering performances are improved impressively, which offers to the users extended possibilities of applications, in the form of a more compact, stabler and cheaper optical assembly than the devices of the previous art.

In practice, the filters of the first stage are tilted along a respective angle selected to obtain along the first collection path a high-pass filtering whose global density corresponds to the sum of the densities of the filters thus placed in series and whose cut-off limit is lower than that obtained by a single filter tilted to its optimum angle.

According to another aspect of the invention, the filter of the second stage is tilted by an angle of incidence chosen to obtain a high-pass filtering along the second collection path and whose density and cut-off limit have been selected for optimum analysis of the low frequency lines.

According to a preferred embodiment of the invention, the device comprises moreover at least one beam separating element, of semi-transparent type, placed on the path of the incident beams and reflected onto a filter of the first and/or second stage and arranged so as not to blank off the said beams, which enables to tilt the filter according to a small or zero angle of incidence.

In practice, the filter(s) of the first stage are manufactured for a cut-off centered on the illumination line whereas the filter of the second stage is manufactured for a cut-off centered on a line different from the illumination line, but closer to the said line.

For instance, the filter(s) with a spectral response in transmission complementary to that in reflection comprise optical elements belonging to the group formed by the Fabry-Perot filters, the multiple cavity interferential filters, the multidielectric filters produced by the multi layer application techniques, LIPPMAN interferential filters, volume phase gratings, so-called NOTCH holographic filters or BRAGG or ASHER filters, the volume phase grating filters, the plane or concave diffraction grating filters used in dispersive configuration in the form of double or analogue monochromators.

The present invention also relates to a process for optimizing the position and the width of the cut-off band implemented by the device according to the invention.

Other characteristics and advantages of the invention will appear in the light of the following detailed description and of the appended drawings on which.

The drawings comprise essentially quite reliable elements. Consequently, they should not only help to understand the invention, but also, if necessary, contribute to defining the said invention.

Figure 4:
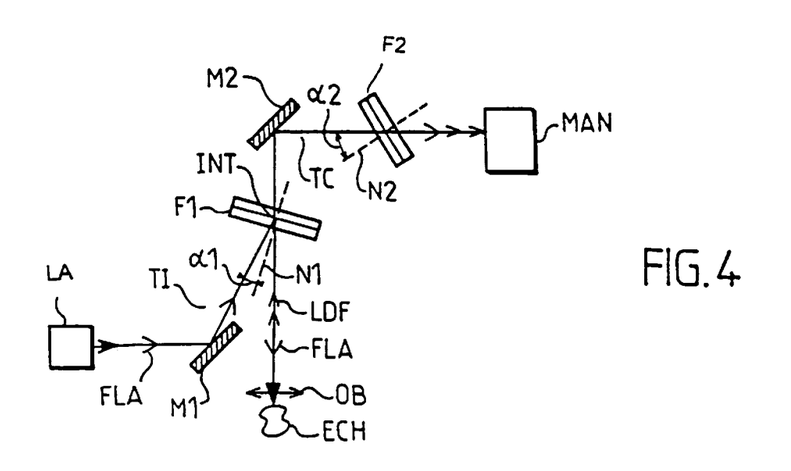
FIG. 4 illustrates an embodiment of the optimization of a filtering device comprising a first filter belonging to the second category and a second filter interposed between the first filter and means of analysis, whereas the tilt of the first and second filters is adjusted according to the invention.

With reference to FIG. 4, a filtering device, designed to be used in particular, but not exhaustively, in RAMAN spectrometry, comprises a laser source LA which here illuminates a sample ECH which emits a light whose spectrum is characteristic of the said sample. An optical illumination path TI is provided between the source LA and the sample ECH placed under a lens OB. Means of analysis and/or of detection MAN are provided to detect the light so emitted LDF. An optical collection path TC is also provided between the sample ECH and the means of analysis MAN.

The collection TC and illumination TI paths cross each other at a point of intersection INT on which is arranged an injector/rejecter filter F1 belonging to the first or second category of optical filters described above.

The filter F1 receives the illumination beam FLA from the illumination means LA and injects it by reflection toward the sample ECH along the illumination path TI.

In the reverse optical direction, the filter F1 receives the emitted light LDF from the sample ECH along the collection path TC, transmits in the collection path TC the useful light emitted and rejects the energizing light from the said collection path TC.

The filter F1 is tilted by an angle of incidence a, with respect to the normal N1 to the beams FLA and LDF.

A second filter F2 is interposed between the filter F1 and means of analysis MAN along the collection path TC. The filter F2 belongs to any one of the first to third categories described above. The filter F2 has an optical density DO2 and a cut-off band BS2 selected to improve the rejection of the spurious light (here the energizing light). It therefore plays the part of blocking the spurious light which can be emitted by the filter F1. It is used here in transmission along the collection path TC.

Advantageously (as we shall see more in detail thereunder), the filter F2 is tilted by an angle of incidence α2 with respect to the normal N2.

Mirrors M1 and M2 partake if needed of conveying the beams along the illumination and collection paths.

The filtering device described with reference to FIG. 4 may have other embodiments. For example, the filter F1 may also inject the beam FLA toward the sample by transmission and reject the spurious light by reflection. The direction of the injection/rejection of the beams is not essential since what is here essential is the complementarity of the spectral responses of the filter F1 in reflection and in transmission.

Figure 5A:
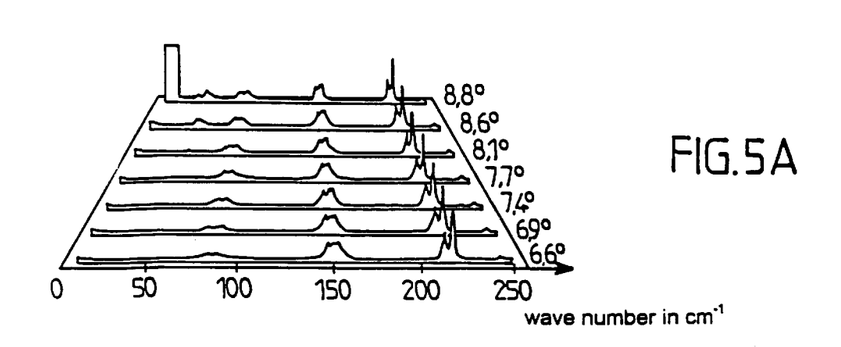
FIG. 5A represents the different spectra of a sulphur sample, obtained with different tilted angles of the first filter

With reference to FIG. 5A, we can see that the spectra of a sulphur sample vary according to the tilting angle of the filter F1. The optimum filter of sulphur (i.e. with analyzable low frequency lines) is obtained by tilting the filter by an angle of 8.6°. When the angle is greater than 8.6°, attenuation of the energizing line is insufficient since when the angle is lower than 8.6°, the low frequency lines are quite weakened and consequently undetectable.

Figure 6:
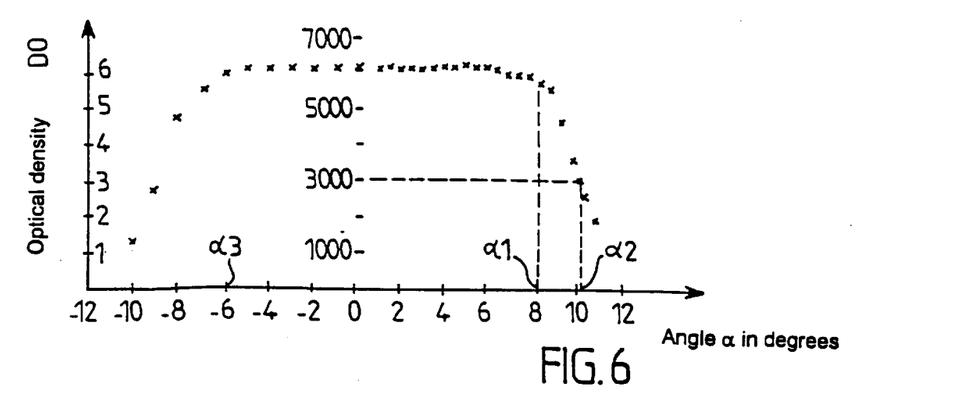
FIG. 6 is a curve showing the variation of the optical density of a filter in relation to the angle of incidence, for a given wavelength.

Variation of the optical density (FIG. 6) in relation to the angle expresses the intrinsic quality of the filter and accounts for the results of the different spectra of FIG. 5A. For example, the optical density of the NOTCH filter F1, measured in monochromatic light for a laser line with wavelength $\lambda_0$, for example 632.8 nm, varies in relation to the angle of incidence $\alpha$ along a curve possessing a flat. For instance, the optical density of 6 is practically constant over a range from −6° ($\alpha_3$) to +8° ($\alpha_1$). For example, an optical density DO of 3 corresponds to an angle of 10.5° ($\alpha_2$).

Figure 7:
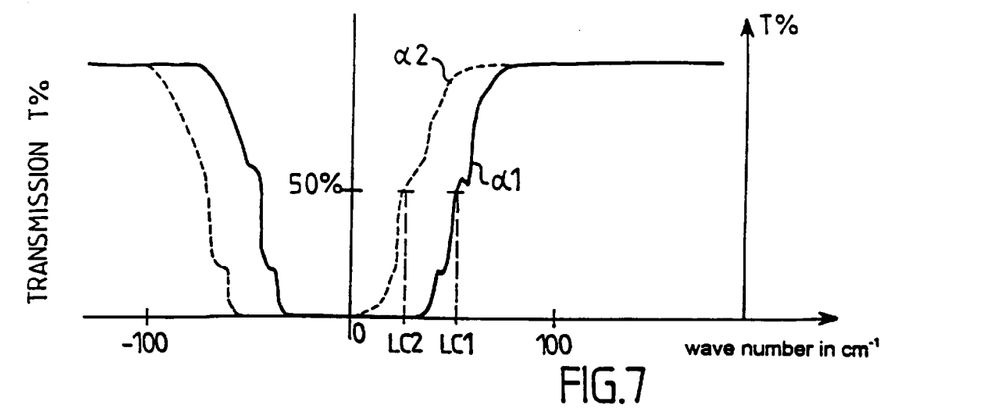
FIG. 7 represents transmission curves for an angle of incidence of 8.1° and an angle of incidence of 10.2° as well as the corresponding halfway vertical cut-off limits.
Figure 8:
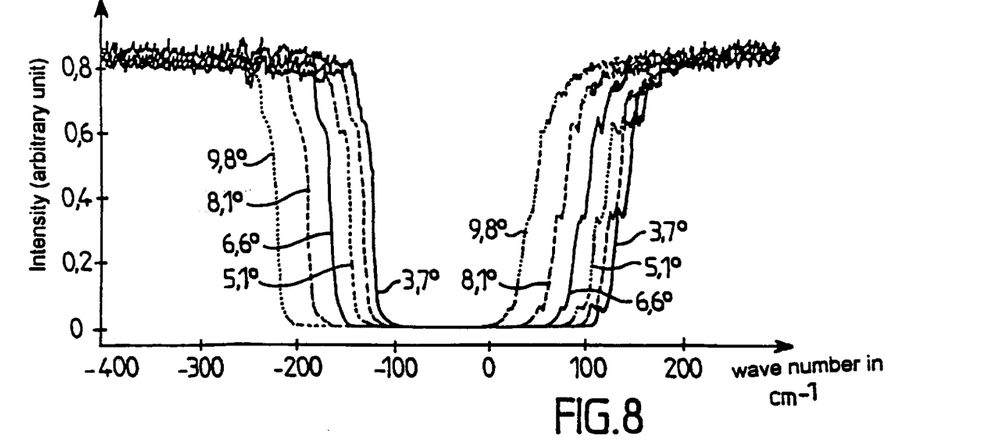
FIG. 8 represents the different transmission curves of a filter of the second category in relation to the angle of incidence of the filter.

FIGS. 7 and 8 show that the cut-off band of the filter F1 moves in relation to the angle $\alpha$. The wavelength scale is here centered on the energizing laser line at 632.8 nm. The movement of the cut-off band is obvious when the angle of incidence varies from 9.8° to 3.7° (FIG. 8).

With reference to FIG. 7, the spectral response in transmission of a filter with an angle of incidence of 8.1° ($\alpha_1$) and an optical density DO of 6 exhibits a halfway vertical cut-off limit LC1 with a steep slope at approx. 50 cm$^{-1}$ from the energizing line whereas a filter with an angle of incidence of 10.5° ($\alpha_2$) and an optical density DO of 3 shows a halfway vertical cut-off limit LC2 with a steep slope at approx. 20 cm$^{-1}$ from the energizing line. By increasing the value of the angle of incidence of the filter F1, the halfway vertical cut-off limit comes therefore closer to the energizing line, but the optical density decreases.

The applicant has observed that instead of using a single filter with a high optical density for the energizing line, but high cut-off limits, i.e. relatively remote from the said energizing line, it is advisable to use according to the invention, two filters with a respectively lower optical density, but with a lower cut-off limit, whereby both these filters, so connected, are equivalent to a filter which would have a high optical density (here 6) and a low cut-off limit (for example 20 cm$^{-1}$ from the energizing line halfway upward).

The applicant has used these observations for the spectrometry apparatus described with reference to FIG. 4 to which we are again referring.

According to the invention, the first filter F1 is tilted by an angle of incidence $\alpha_1$ whose value is adjusted in order to bring the cut-off limit of the first filter closer to one of the sides of the line of the illumination beam FLA. This adjustment reduces the optical density of the first filter, whereas the association of the first and second filters F1 and F2 enables to obtain high-pass filtering whose global density corresponds to the sum of the densities of the first and second filters and whose cut-off limit is lower than that obtained by a single filter tilted to its optimum angle.

The value of $\alpha_1$ is adjusted in relation to the optical densities DO1 and DO2 and to the cut-off limits of the filters F1 and F2 so that the filtering device as a whole is of high-pass type with a global optical density corresponding to the sum of the individual optical densities of the filters F1 and F2 and a cut-off band whose position and width are adjusted to be compatible with an optimum spectral analysis of the sample.

For example, we select the value of 10.5° for $\alpha_1$ and an optical density DO1 of 3.

In practice, the filtering characteristics of the filter F2 are those of the filters of the first to third categories described above.

Preferably, the filter F2 is also a NOTCH filter of the second category. In this advantageous but not exhaustive example, the filter F2 is then also tilted by an angle $\alpha_2$ (with $\alpha_2$ at least more or less equal to $\alpha_1$) in order to bring the cut-off limit of its cut-off band closer to the energizing line at least up to the cut-off limit halfway up the first filter F1. The angle $\alpha_2$ can also be different from $\alpha_1$ but the width of the cut-off band of the filter F2 must be lower than or equal to the width of the filter F1, which is reflected by angle $\alpha_2$ at least equal to $\alpha_1$ in case when the filters F1 and F2 are more or less identical NOTCH filters.

Figure 5B:
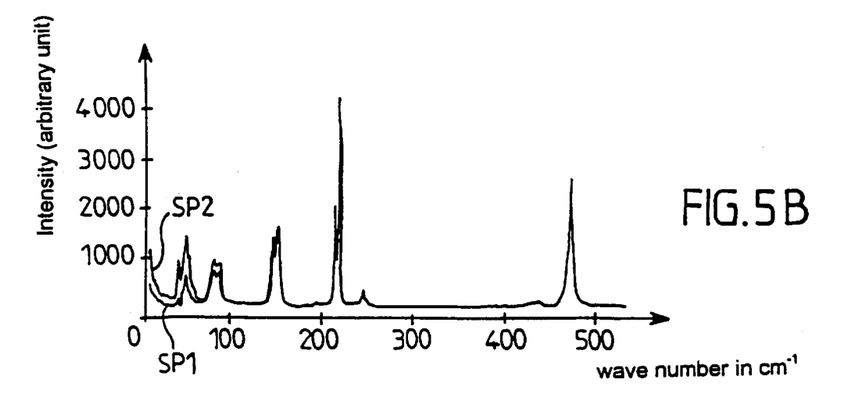
FIG. 5B is an enlarged view, partially corrected, of the optimum spectrum of sulphur, obtained by tilting the first filter by an angle of 8.6°, the lowest frequency line being 49.3 cm$^{-1}$ away from the energizing line.
Figure 9:
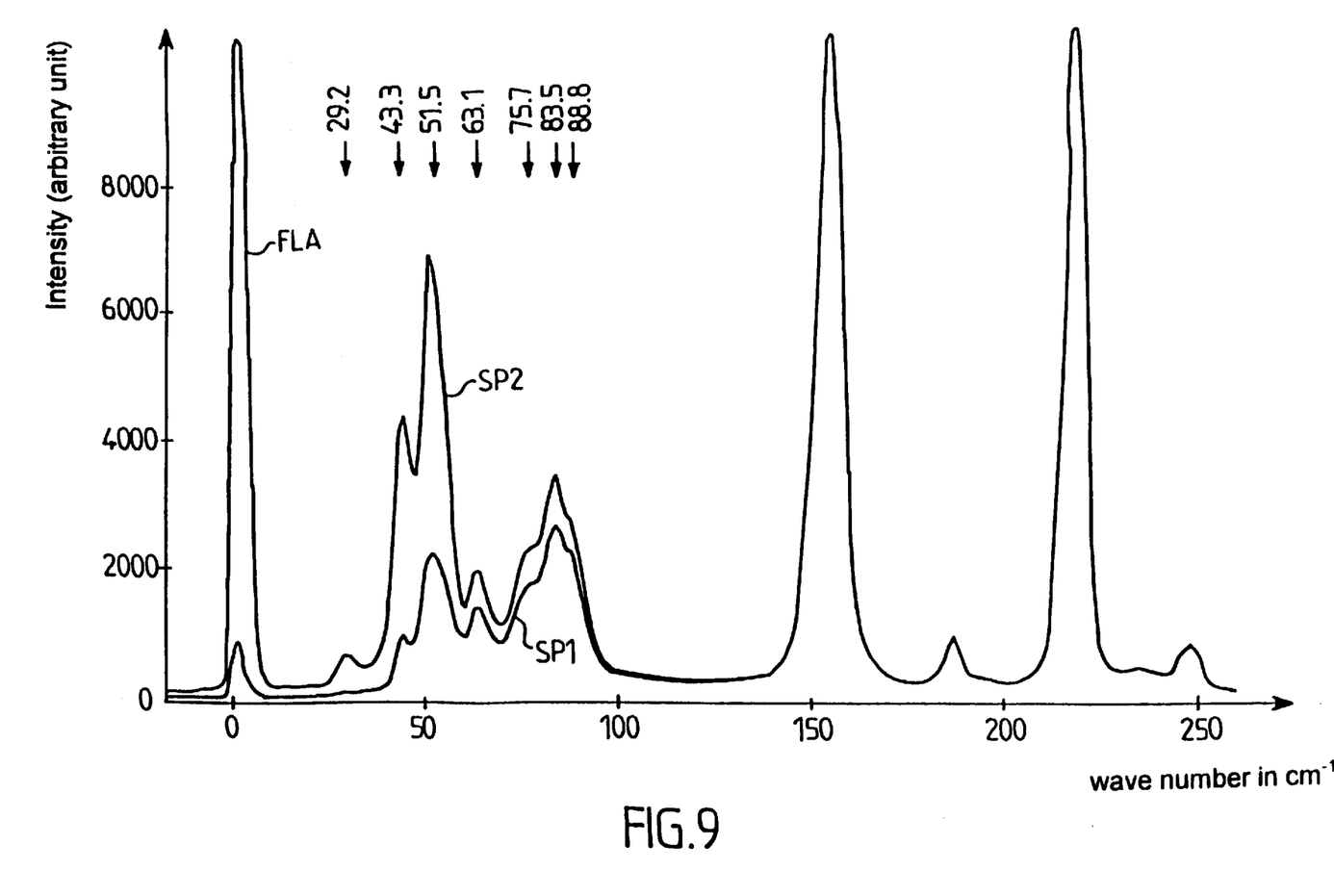
FIG. 9 is a RAMAN spectrum of sulphur which illustrates the results of optimum coupling of the first and second filters according to the invention, showing the detection of the low frequency lines, notably the line situated 29.2 cm$^{-1}$ away from the energizing line, whereas this FIG. 9 should be compared to FIG. 5B representing the spectrum of the same product, but with a single filter, tilted to its optimum angle.

With reference to FIG. 9, the spectrum obtained by the filtering arrangement as a whole (filters F1 and F2) for a sulphur sample comprises low frequency lines at 29.2; 43.3; 51.5; 63.1 cm$^{-1}$, . . . from the energizing line. The spectrum SP2 corresponds to a corrected spectrum whereas the spectrum SP1 corresponds to a non-corrected spectrum of the filter transmission. It should be noted that with a single filter, the best spectrum (FIG. 5B) is obtained with an angle of 8.6° and allows only for relatively weakened detection of the 51.5 and 43.3 cm$^{-1}$ lines.

It should be noted that the filtering optimization according to the invention is based upon the addivitity of the optical densities of both (or more) filters which thus enables to provide the requested rejection rate at the wavelength of the energizing line and on the product of the transmission which thus enables to adjust the slope and cut-off limit of the cut-off band close to the energizing line.

It should be remarked that optimization of the position and of the width of the cut-off band of the filtering device constituted of the filters F1 and F2 adheres to the invention in relation to the optical density desired. Thus, according to the invention, there is no more need to optimize the filtering in relation to the sample as was the case with a filter used on its own.

Optimization of the position and of the width of the cut-off band of the filters F1 and F2 can be performed according to a mechanical, piezoelectric or electromechanical slaving arrangement of the angles $\alpha_1$ and/or $\alpha_2$ (in case when the filtering characteristics of the second filter F2 also vary in relation to the angle of incidence). Slaving can take place according to a predetermined law in order to choose the low frequency limit. This law can be established empirically in relation to the imperfections observed on the responses of the actual filters. This is particularly interesting if we wish to use several filters of different types and/or tilted angles.

It should be noted that the number of filters in series is limited only by the transmission of the filters. It may thus be greater than 2. The association of the filters in series can be formed of filters of different types.

For example, it is possible to connect a filter F1 of holographic NOTCH type in transmission with a filter F2 of interferential NOTCH type in reflection or vice versa.

Another possible association may consist of a filter F1 of BRAGG or ASHER type with a filter F2 of dispersive network type, or still a filter F1 of interferential type with an absorption filter F2.

Figure 10A:
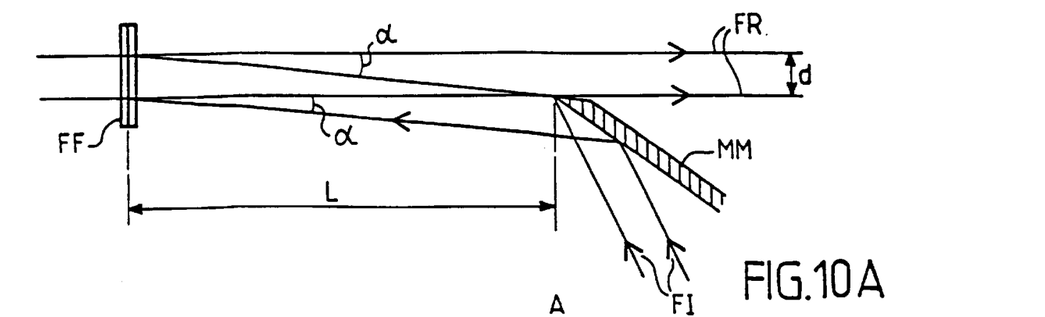
FIG. 10A is a diagrammatic representation of the angular limitation of the filters and FIG. 10B is a diagrammatic illustration of the use of a neutral separating plate which brings a solution to this geometrical limitation according to the invention.

With reference to FIG. 10A, the minimum angle of incidence of the filter $\alpha$ is limited geometrically due to partial overlap of the incident F1 and reflected FR beams. For example, for an incident and a reflected beam having each a diameter d and crossing each other at a distance L from the filter FF, the following condition:

$$\sin \alpha \geq d/L$$

must be respected to prevent partial blanking by the return mirror MM.

The applicant has noticed that the limitation in practice of the angles of incidence on the filters used in reflection, due to the ovelapping of the incident and the reflected beam, constitutes a major shortcoming since the optimum angle such as defined according to the invention can be lower than this limit for filters currently available on the market.

Figure 10B:
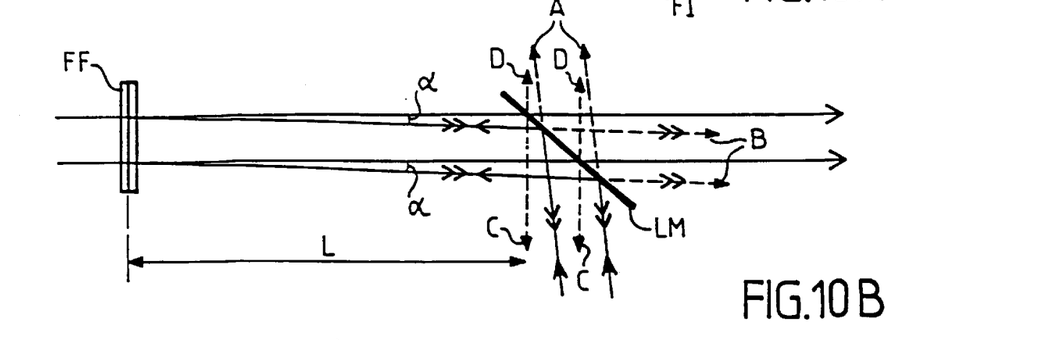

With reference to FIG. 10B, the return mirror MM is replaced with a neutral semi-transparent separator LM. Thanks to this separating plate, the angle of incidence α on the filter FF can take on any value, without any limitation, including the value zero if the properties of the filter require so. Moreover, the filter/separating plate distance L can be much shorter, which improves the compactness of the unit.

It should be noted that the energy losses due to beams partially transmitted A and B or partially reflected C or D by the separating plate LM are acceptable in practice inasmuch as the laser sources offer generally a power greater than the power necessary to correct energizing beneath the threshold of thermal or photochemical degradation of the sample examined.

With reference to FIG. 9, the spectrum shows that only the very low frequencies of the Stokes or anti-Stokes side of the Raman spectrum of sulphur can be analyzed by the spectral analysis means of the device described with reference to FIG. 4 (high-pass filter).

The applicant provides a solution to this problem thanks to optimizing a filtering device capable to let all the low frequencies pass through the collection path, i.e. the so-called Stokes as well as the so-called anti-Stokes frequencies.

This solution according to the invention is founded on the parallel arrangement of two stages whose first comprises at least two filters installed similarly to the filters F1 and F2 described above, to allow for the passage of the low frequency lines situated on one side of the energizing line (STOKES lines for instance) and whose second comprises at least one filter enabling the passage of the low frequency lines situated on the other side of the energizing line (ANTISTOKES lines for example), whereby the beams from the first and second stages are recombined to be conveyed toward the spectral analyzer.

Figure 11A:
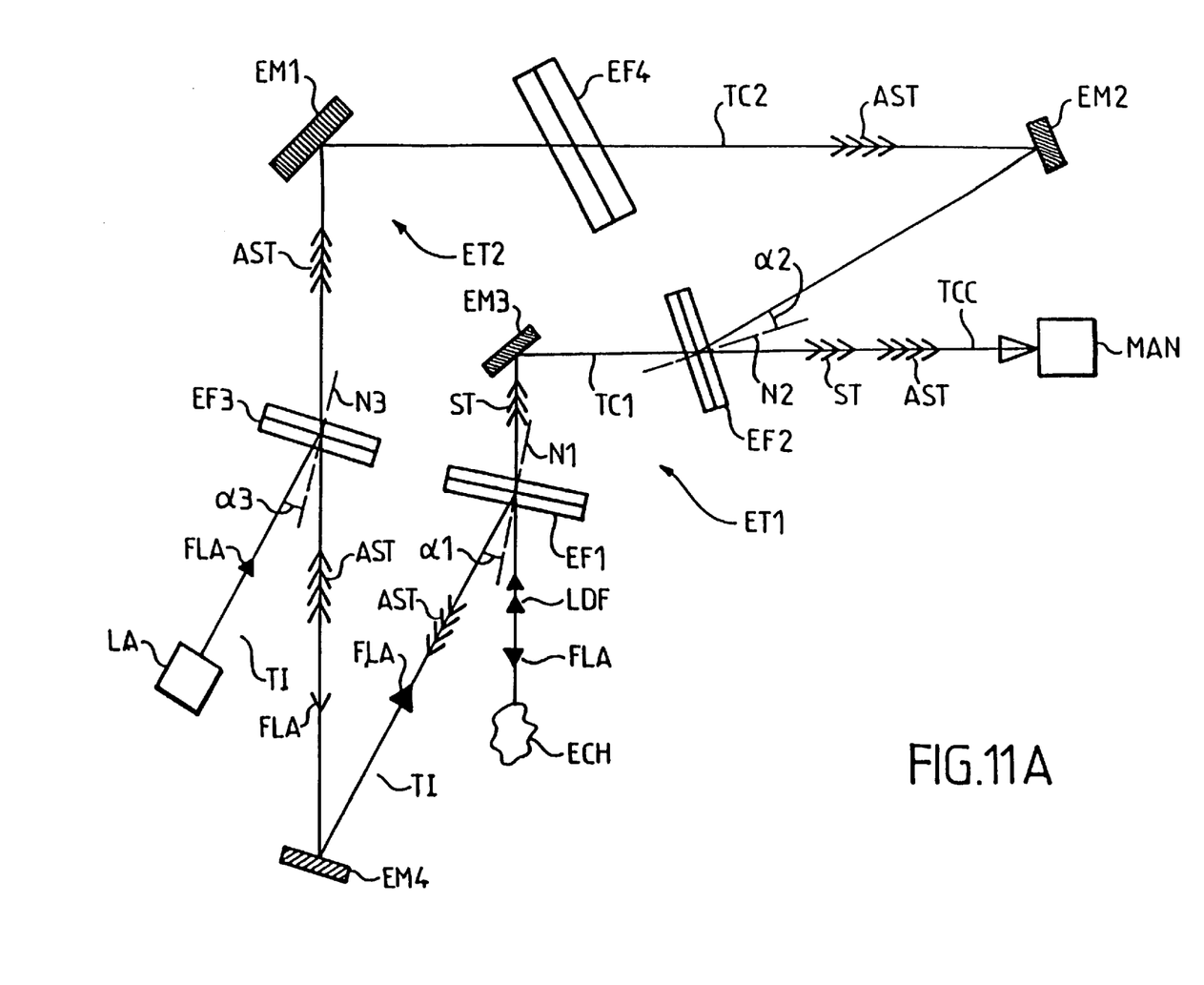
FIG. 11A is a diagrammatic representation of another embodiment of an optical filtering device with two filtering stages each comprising two filters coupled similarly to the first and second filters according to the invention.

With reference to FIG. 11A, both stages ET1 and ET2 are more or less similar to the assembly formed by the filters F1 and F2 described with reference to FIG. 4.

The stages ET1 and ET2 are mounted in parallel and possess a common illumination path TI and first and second collection paths TC1 and TC2 arranged in parallel and liable to meet according to a common collection path TCC at the level of means of analysis MAN.

The first filtering stage ET1 comprises an optical filter EF1 with an optical density DO1 at the wavelength of the illumination beam, a cut-off band BS1 as well as a spectral response in reflection complementary to that in transmission. It belongs to the first or second category described previously.

The filter EF1 receives an illumination beam FLA according to the common illumination path TI and injects it toward a sample ECH and receives the light LDF emitted by the sample so illuminated. The filter EF1 directs by transmission a first portion ST of the light LDF emitted toward the means of analysis MAN. Due to its spectral response in transmission complementary to that in reflection, the filter EF1 directs by reflection a second portion AST of the light LDF emitted, complementary to the first portion ST, toward the second stage ET2. For example, the first portion ST comprises at least the STOKES lines of the RAMAN spectrum while the second portion comprises at least the ANTISTOKES lines of the RAMAN spectrum.

The first stage ET1 also comprises an optical filter EF2 interposed between the filter EF1 and the means of analysis MAN. The filter EF2 has an optical density DO2 at the wavelength of the illumination beam, and a cut-off band BS2 chosen to improve the rejection of the light which would be of no use for the analysis. In practice, the width of the band BS2 is lower than or equal to that of the filter EF1. The filter EF2 belongs to one of the first to third categories described previously.

The second filtering stage ET2 comprises an optical filter EF3 with an optical density DO3 and a cut-off band BS3. To facilitate the offsetting of the cut-off bands that we shall describe more in detail thereunder, the filter EF3 is designed for cutting off, at high density, at a wavelength $\lambda_1$ different from but close to that of the illumination beam $\lambda_0$ which is reflected by a cut-off band BS3 centered for example at 100 cm$^{-1}$ from the line of the illumination beam FLA.

The filter EF3 receives the illumination beam FLA from the source LA and directs it by reflection toward the filter EF1 along the common illumination path. It also receives the second portion AST of the light emitted by the sample and directs it, by transmission and after filtering, toward the means of analysis MAN along the second collection path TC2.

The second stage ET2 comprises if necessary (FIG. 11A) an optical filter EF4 interposed between the filter EF3 and the means of analysis MAN along the second collection path TC2. The filter EF4 has an optical density DO4 and a cut-off band BS4 chosen to improve the rejection of the spurious light along the second collection path TC2.

The second stage ET2 (the filter EF3 on FIG. 11A) receives the portion of the light AST rejected by reflection by the filter EF1 and transmits it, after filtering, to the second collection path TC2.

Figure 11B:
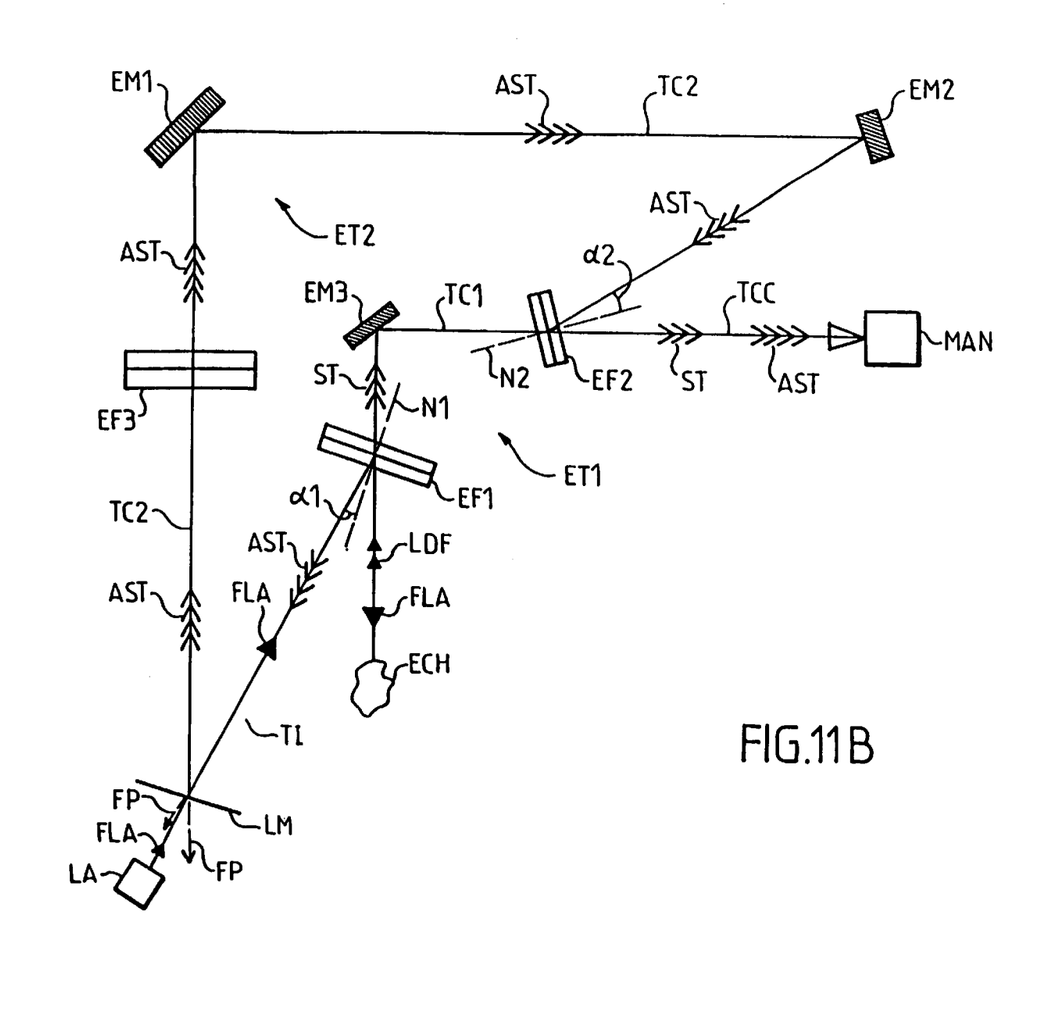
FIG. 11B is a diagrammatic representation of a variation of the device described with reference to FIG. 11A in which a neutral separating plate replaces a mirror according to the invention to enable tilting the filters without any geometrical limitation.

With reference to FIG. 11B, a separating plate LM, described with reference to FIG. 10B, replaces the mirror EM4 described with reference to FIG. 11A to allow free orientation, and without any angle restriction, of the filter EF3 which is here used for transmission only.

Injection of the laser beam FLA is performed by the semi-transparent plate-type beam separator LM which reflects the illumination beam FLA toward the first stage ET1 along the common illumination path TI. The beam separator receives (in the direction opposite to the injection) the second portion AST of the light emitted by the sample along the common illumination path and directs it, by reflection and without any filtering, toward the filter EF3 interposed between the separator element LM and means of analysis MAN along the second collection path TC2. The beams FP partially transmitted by the plate LM are lost for the analysis. They are represented as a dotted line with reference to FIG. 11B.

Thanks to this separating plate LM, the geometrical limitation regarding the tilt of the filter EF3 is done away since such a plate prevents the incident and reflected beams from being blanked off. The filter EF3 can thus be tilted by a small angle of incidence, in the order of a few degrees, even zero.

Figure 11C:
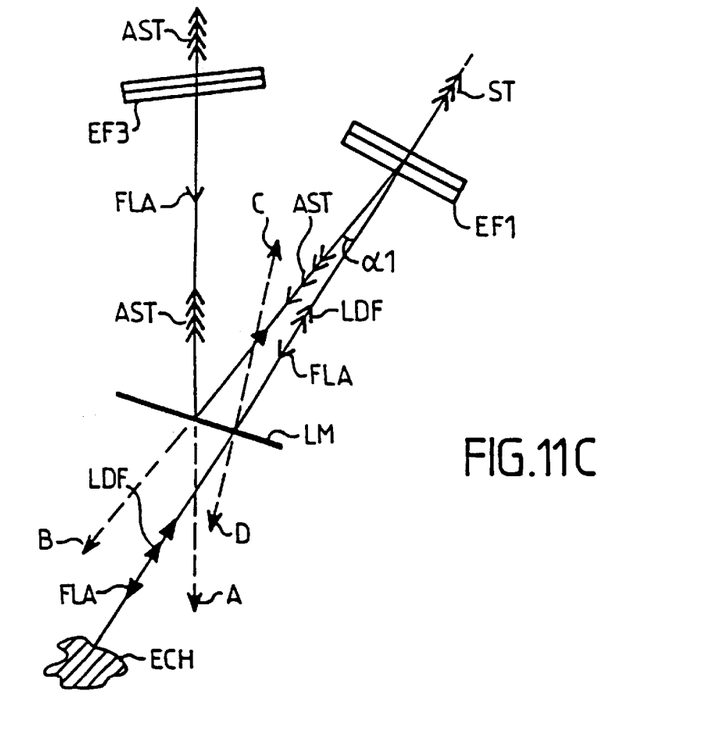
FIG. 11C is a diagrammatic representation of another variation of the device described with reference to FIG. 11A in which a neutral separating plate is placed on the path of the injection/rejection of the laser beam according to the invention.

With reference to FIG. 11C, a separating plate LM, such as that described with reference to FIG. 10B replaces the return mirror EM4 described with reference to FIG. 11A and the sample ECH is placed at the point where the source LA is arranged with reference to FIG. 11B. In this configuration, the filter EF1 may be operated at angles smaller than the geometrical limit mentioned above. The energy losses due to the beams partially transmitted A and B or partially reflected C or D by the separating plate LM are represented as a dotted line as with reference to FIG. 10B.

The semi-transparent plate-type beam separator LM plays two roles, a reflecting one and a transmitting one.

As regards the beam reflecting role, the separator LM reflects the illumination beam FLA toward the first stage ET1 along the common illumination path TI. The beam separator receives (in the direction opposite to the injection) the second portion AST of the light emitted by the sample along the common illumination path and directs it, by reflection and without any filtering, toward the filter EF3 interposed between the separating element LM and the means of analysis MAN along the second collection path TC2.

As regards the beam transmitting role, the beam separator LM transmits the illumination beam FLA from the filter EF1 toward the sample ECH along the common illumination path TI. The beam separator receives (in the direction opposite to the injection) the light LDF emitted by the sample along the common illumination path and directs it, by transmission and without filtering, toward the filter EF1.

It should be noted that the use of a neutral separating plate has, according to the invention, a general character applicable to numerous optical configurations with a view to preventing the incident/reflected beams from being blanked off onto the filters.

We are now making renewed reference to FIGS. 11A or 11B. In order to recombine the anti-Stokes AST section transmitted by the filter EF3 (via the filter EF4 as in FIG. 11A, without filter EF4 as in FIG. 11B) with the Stokes ST section transmitted by the filter EF1 (via the filter EF2), it is possible to use mirrors EM1, EM2, EM3, EM4 (FIG. 11A) and the filter EF2. For example, the mirror EM2 reflects the anti-Stokes beam AST on the rear face of the filter EF2. Both beams AST and ST thus recombined are then sent toward the spectral analyzer MAN. As a variation, it is possible to use a revolving modulator (not represented) mounted on the collection path TC1 and which transmits alternately the lines AST and ST toward the means of analysis.

According to the invention, the filters EF1 and EF3 are arranged to bring the cut-off limit (halfway up) closer to the cut-off band BS1 on one side of the energizing line and to bring the cut-off limit (halfway up) closer to the cut-off band BS3 on the other side of the energizing line.

The value of the angles of the filters EF1, EF2 and EF3 (and EF4 if necessary) is adjusted in relation to the optical densities and to the cut-off limits of the filters constituting the first and second stages ET1 and ET2 so that the filtering device as a whole is of the band eliminating type with an optical density corresponding to that of each stage and a cut-off band whose cut-off limits are placed on both sides of the illumination line and compatible with an optimum spectral analysis of the sample.

With reference to FIGS. 12A to 14B, we shall illustrate an embodiment of such an optimization of the width and of the position of the cut-off band of a band eliminating filter according to the invention.

Figure 12A:
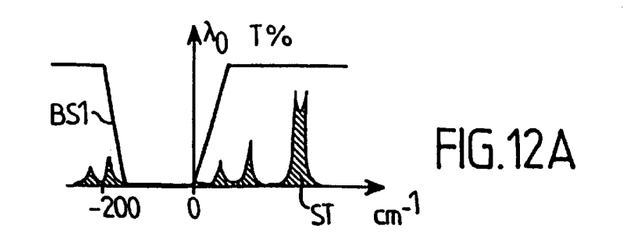
FIGS. 12A and 12B are respectively spectral response curves in transmission and in reflection of the first stage in which the cut-off band is offset to one side with respect to the energizing line according to the invention.
Figure 12B:
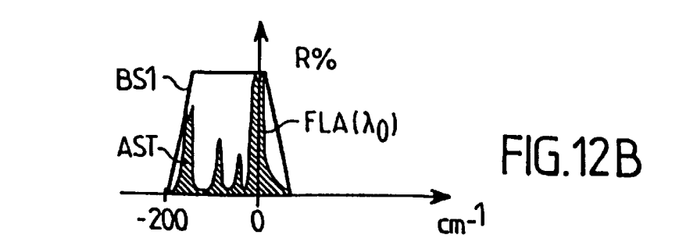

With reference to FIGS. 12A and 12B, the filter EF1 belongs for instance to the second category. It is designed for cutting with good attenuation at the wavelength of the illumination beam. According to the invention, it is arranged (tilted) so that its cut-off band BS1 contains at the same time the energizing line and a portion AST of the Anti-Stokes spectrum (negative frequencies in $cm^{-1}$). The optical density DO1 is for example equal to 3. The angle of incidence of the filter EF1 is for example in the region of 10.5°. The width of the cut-off band BS1 is in the region of 200 $cm^{-1}$.

It should be noted that the cut-off band BS1 is not centered on the wavelength $\lambda_0$ any longer, corresponding to the energizing line (origin in wave number of the abscissa axis), but slightly offset toward the anti-Stokes AST region due to the angle adjustment of the filter EF1 and the choice of the optical density DO1 at the wavelength of the energizing line.

This offset of the cut-off band BS1 thus allows to let through in transmission the Stokes lines ST of the RAMAN spectrum of the sample analyzed and to reflect the anti-Stokes lines AST of the RAMAN spectrum as well as the energizing line FLA toward the second stage.

The filter EF1 transmits hence the Stokes lines ST toward the means of analysis MAN and reflects toward the second stage both the energizing radiation FLA and the low frequency portion of the anti-Stokes AST RAMAN spectrum, typically at 200 $cm^{-1}$ from the energizing line.

The filter EF2 receives the lines ST in order to filter them by transmission. For example, the filter EF2 belongs to the same category as the filter EF1. The filter EF2 has for instance an optical density greater than or equal to 3. The angle of incidence of the filter EF2 is for instance in the region of 10.5°. It is the additivity of the optical densities of the filters EF1 and EF2 which enables here to attenuate drastically the energizing line.

Figure 13A:
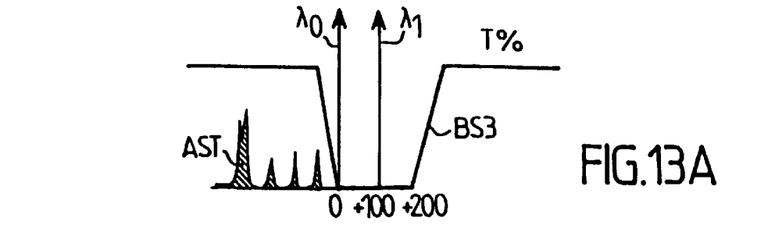
FIGS. 13A and 13B are respectively spectral response curves in transmission and in reflection of the second stage in which the cut-off band is offset to the other side with respect to a line close to the energizing line according to the invention.
Figure 13B:
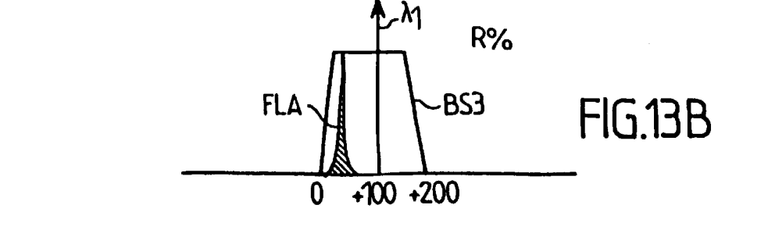

With reference to FIGS. 13A and 13B, the filter EF3 belongs for example to the second category. It is designed to cut off with good attenuation at a wavelength $\lambda_1$ different from that $\lambda_2$ of the illumination beam, but close to it. According to the invention, it is arranged (tilted) so that its cut-off band BS3 crosses both the energizing line and a portion of the STOKES spectrum ST, but lets through the antistokes lines AST. The angle of incidence of the filter EF3 is for instance in the region of 10° in the case of FIG. 11A or close to 0 in the case of FIG. 11B.

The cut-off band BS3 of the filter EF3 is not centered on the wavelength corresponding to the energizing line $\lambda_0$ (0 on the frequency scale), but slightly offset by example toward the STOKES region (positive frequencies in $cm^{-1}$). This offset of the cut-off band BS3 (for example by 100 $cm^{-1}$) enables to let through in transmission the anti-Stokes lines AST of the RAMAN spectrum of the sample analyzed toward the means of analysis along the second collection path TC2 and to filter the energizing line with high attenuation. Thus, the energizing line FLA is not transmitted by the filter EF3.

If needed, the filter EF4 (FIG. 11A) receives the beam AST from the filter EF3 and attenuates further, if necessary, the energizing line FLA by transmission. For example, the filter EF4 belongs to the same category as the filter EF3. The filter EF4 has for instance an optical density equal to or greater than 3 and an angle of incidence in the region of 10° or less. It should be noted that the filter EF4 can be dispensed with providing the filter EF3 has sufficient optical density to attenuate the energizing line.

Figures 14A, 14B:
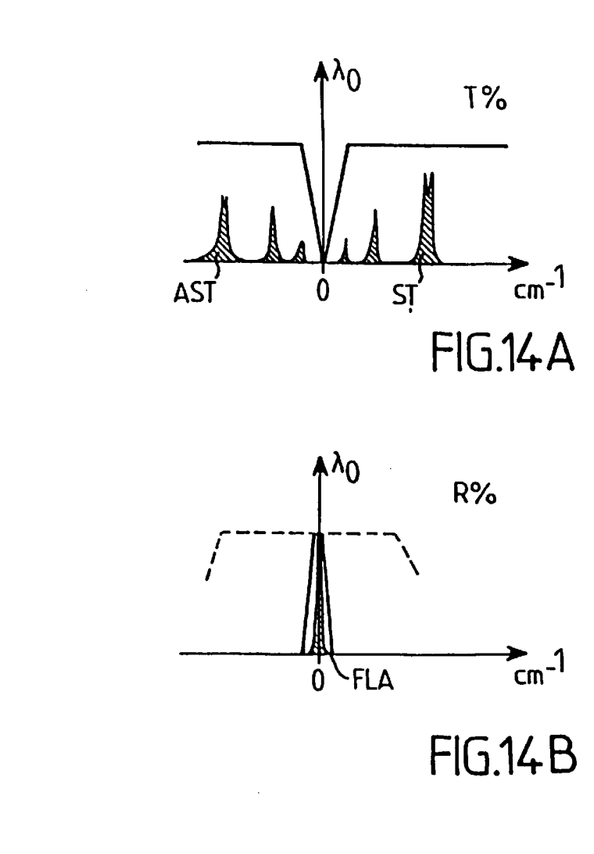
FIGS. 14A and 14B are respectively response curves in transmission and in reflection of the optimum coupling of the optical elements described with reference to FIGS. 11A, 11B or 11C.

With reference to FIGS. 14A and 14B, the combination of the cut-off bands BS1 and BS3 enables to collect and to detect the Stokes lines ST and the anti-Stokes lines AST, while attenuating quite drastically the energizing line FLA. For instance, the global density of the filtering device is at least equal to 6 for the first stage (DO1 +DO2=3+3=6) and the second stage (DO3=6).

The angles of the filters are adjusted in a similar way to that of the angles of the filters F1 and F2 described with reference to FIG. 4.

It should be noted that the optimization of the position and of the width of the cut-off bands of the filters uses here advantageously the fact that the filters EF1 and EF2 are manufactured for cutting off an energizing line at $\lambda_0$ whereas the filters EF3 and EF4 (if needed) are manufactured for cutting an energizing line $\lambda_1$ different from the line at $\lambda_2$ but close to it, for example +/−100 cm$^{-1}$. This difference in the choice of the filters (an advantageous but not restrictive difference) associated with the tilt adjustment of the angles of the said filters enables to obtain the filtering template required according to the invention.

The filtering device described with reference to FIGS. 11A, 11B or 11C can have other embodiments. For example, the filter EF1 may also direct the beam FLA toward the sample by reflection and direct the beam LDF toward the means of analysis by transmission. The direction of injection/rejection of the beams is not essential since what really matters here is the complementarity of the spectral responses of the filters EF1 and EF3 in reflection and in transmission.

Advantageously, the spectrometry apparatus described with reference to FIGS. 4, 11A, 11B or 11C is associated with means used to expand the illumination beam and to spatial filtering means arranged in compliance with the patent of the applicant No. EP0535753 (whose description is part of this application to whom it may concern) in order to obtain illumination and collection beams with the same aperture and to improve further the spectral and spatial definitions of the apparatus. The filtering means enable thus to match the diameter of the illumination beam thus expanded, with the diaphragm of the lens of the microscope under which the sample is placed.

We claim:

1. A device for optimizing the position and the width of the cut-off band of an optical filtering device comprising a first optical filter with a spectral response in transmission complementary to that in reflection and liable, on the one hand, to receive an illumination beam and to inject it onto a sample and, on the other, to receive the light transmitted by the sample so illuminated, and to direct it towards means of analysis after filtering, and a second optical filter interposed between the first filter and the means of analysis, wherein the first filter is tilted by an angle of incidence whose value is adjusted to bring the cut-off limit of the first filter closer to one of the sides of the line of the illumination beam, which reduces the optical density of the first filter, while the association of the first and second filters enables to obtain a high-pass filtering whose global density corresponds to the sum of the densities of the first and second filters and whose cut-off limit is lower than that obtained by a single filter tilted to its optimum angle.

2. A device according to claim 1, wherein the second filter is tilted by an angle of incidence whose value is adjusted to bring the cut-off limit of the second filter closer to at least the cut-off limit of the first filter.

3. A device for optimizing the position and the width of the cut-off band of an optical filtering device composed of first and second filtering stages, a common illumination path and first and second collection paths mounted in parallel and liable to meet according to a common collection path at the level of means of analysis, whereby the first stage comprises at least one filter with a spectral response in transmission complementary to that in reflection and liable to receive an illumination beam and to inject it into a sample, and, to receive the light emitted by the sample so illuminated, and to direct a first portion of the said light along the first collection path, and a second portion of the said light, complementary to the first, towards the second filtering stage which receives the said second portion and directs it after filtering along the second collection path, wherein the first filtering stage comprises an association of several filters placed in series and arranged to bring the cut-off limit of the first stage closer to one side of the line of the illumination beam, and in that the second stage comprises at least one filter arranged to bring the cut-off limit of the second stage closer to the other side of the line of the illumination beam, which enables to obtain at the level of the common collection path a band eliminating filtering whose cut-off limits are positioned on either side of the illumination line with a view to an optimum analysis of the low frequency lines.

4. A device according to claim 3, wherein the filters of the first stage are tilted by a respective angle selected to obtain along the first collection path a high-pass filtering whose global density corresponds to the sum of the densities of the filters thus placed in series and whose cut-off limit is lower than that obtained by a single filter tilted to its optimum angle.

5. A device according to claim 3, wherein the filter of the second stage is tilted by an angle of incidence chosen to obtain a high-pass filtering along the second collection path and whose density and cut-off limit have been selected for optimum analysis of the low frequency lines.

6. A device according to claim 3, comprising moreover one beam separating element, of semi-transparent type, placed on the path of the incident beams and reflected onto the filter(s) of the first and/or second stages and arranged not to blank off the said beams, which enables to tilt the said filter(s) according to a small or zero angle of incidence.

7. A device according to claim 3, wherein the filter(s) of the first stage are manufactured for a cut-off centered on the illumination line whereas the filter of the second stage is manufactured for a cut-off centered on a line different from the illumination line, but closer to the said line.

8. A device according to one of the previous claims, wherein the filter(s) with a spectral response in transmission complementary to that in reflection comprise optical elements belonging to the group formed by Fabry-Perot filters, multiple cavity interferential filters, multidielectric filters produced by thin layer application techniques, LIPPMAN interferential filters, volume phase gratings, so-called NOTCH holographic filters or BRAGG or ASHER filters, volume phase grating filters, plane or concave diffraction grating filters used in dispersive configuration in the form of double or analogue monochromators.

9. A process for optimizing the position and the width of the cut-off band of an optical filtering device implemented by the device according to one of claims 1 to 8.

* * * * *

UNITED STATES PATENT AND TRADEMARK OFFICE
CERTIFICATE OF CORRECTION

PATENT NO. : 5,956,136
DATED : September 21, 1999
INVENTOR(S) : Edouard Da Silva, et al.

It is certified that error appears in the above-identified patent and that said Letters Patent is hereby corrected as shown below:

Cover Page, at [57] ABSTRACT, "fittering" should be -- filtering --.
Column 6, line 48, "incidence a" should be -- incidence $\alpha_1$ --.
Column 12, line 34, "$\lambda_2$" should be -- $\lambda_0$ --.
Column 13, line 9, "$\lambda_2$" should be -- $\lambda_0$ --.

Signed and Sealed this

Twenty-third Day of January, 2001

Attest:

Q. TODD DICKINSON

*Attesting Officer*    *Commissioner of Patents and Trademarks*

UNITED STATES PATENT AND TRADEMARK OFFICE
CERTIFICATE OF CORRECTION

PATENT NO : 5,956,136
DATED : September 21, 1999
INVENTOR(S) : Edouard Da Silva et al.

It is certified that error appears in the above-identified patent and that said Letters Patent is hereby corrected as shown below:

Cover page, at item [57], in the Abstract, line 1, "fittering" should be -- filtering --.

Signed and Sealed this

Twentieth Day of March, 2001

Attest:

NICHOLAS P. GODICI

*Attesting Officer*  *Acting Director of the United States Patent and Trademark Office*